United States Patent [19]
Ito et al.

[11] Patent Number: 5,867,532
[45] Date of Patent: Feb. 2, 1999

[54] DATA RECEPTION APPARATUS, DATA TRANSMISSION APPARATUS AND METHOD THEREOF

[75] Inventors: Osamu Ito, Tokyo; Yasunari Ikeda, Kanagawa; Tamotsu Ikeda, Tokyo, all of Japan

[73] Assignee: Sony Corporation, Tokyo, Japan

[21] Appl. No.: 622,401

[22] Filed: Mar. 27, 1996

[30] Foreign Application Priority Data

Mar. 31, 1995 [JP] Japan ..................................... 7-076871

[51] Int. Cl.⁶ .......................................................... H04L 5/12
[52] U.S. Cl. .......................... 375/265; 375/295; 375/341
[58] Field of Search .................................. 375/260, 262, 375/265, 295, 341, 343, 355, 200, 206, 208; 370/208, 210, 527

[56] References Cited

U.S. PATENT DOCUMENTS

| | | | |
|---|---|---|---|
| 5,307,376 | 4/1994 | Castelain | 375/260 |
| 5,452,288 | 9/1995 | Rahuel et al. | 375/260 |
| 5,467,132 | 11/1995 | Fazel et al. | 348/390 |
| 5,521,943 | 5/1996 | Dambacher | 375/295 |
| 5,659,573 | 8/1997 | Bruckert et al. | 375/200 |
| 5,748,677 | 5/1998 | Kumar | 375/260 |

FOREIGN PATENT DOCUMENTS

| | | | |
|---|---|---|---|
| 0553841 | 8/1993 | European Pat. Off. | H04L 5/06 |
| 0617531 | 9/1994 | European Pat. Off. | H04L 27/02 |

*Primary Examiner*—Tesfaldet Bocure
*Attorney, Agent, or Firm*—Jay H. Maioli

[57] ABSTRACT

A data reception apparatus receiving a transmission signal that has been modulated by a predetermined modulation method such as a trellis coding, inserted with a predetermined reference data in a predetermined period, and transmitted through a transmission path, and that decodes the received signal. The data reception apparatus includes: a demodulating unit for demodulating the received signal and providing a demodulated signal; a reference data extracting unit for extracting the inserted reference data from the demodulated signal; an estimating unit for estimating the transmission characteristic of the transmission path with reference to the extracted reference data for providing an estimated data; and a decoding unit for decoding the demodulated signal with reference to the estimated data.

15 Claims, 15 Drawing Sheets

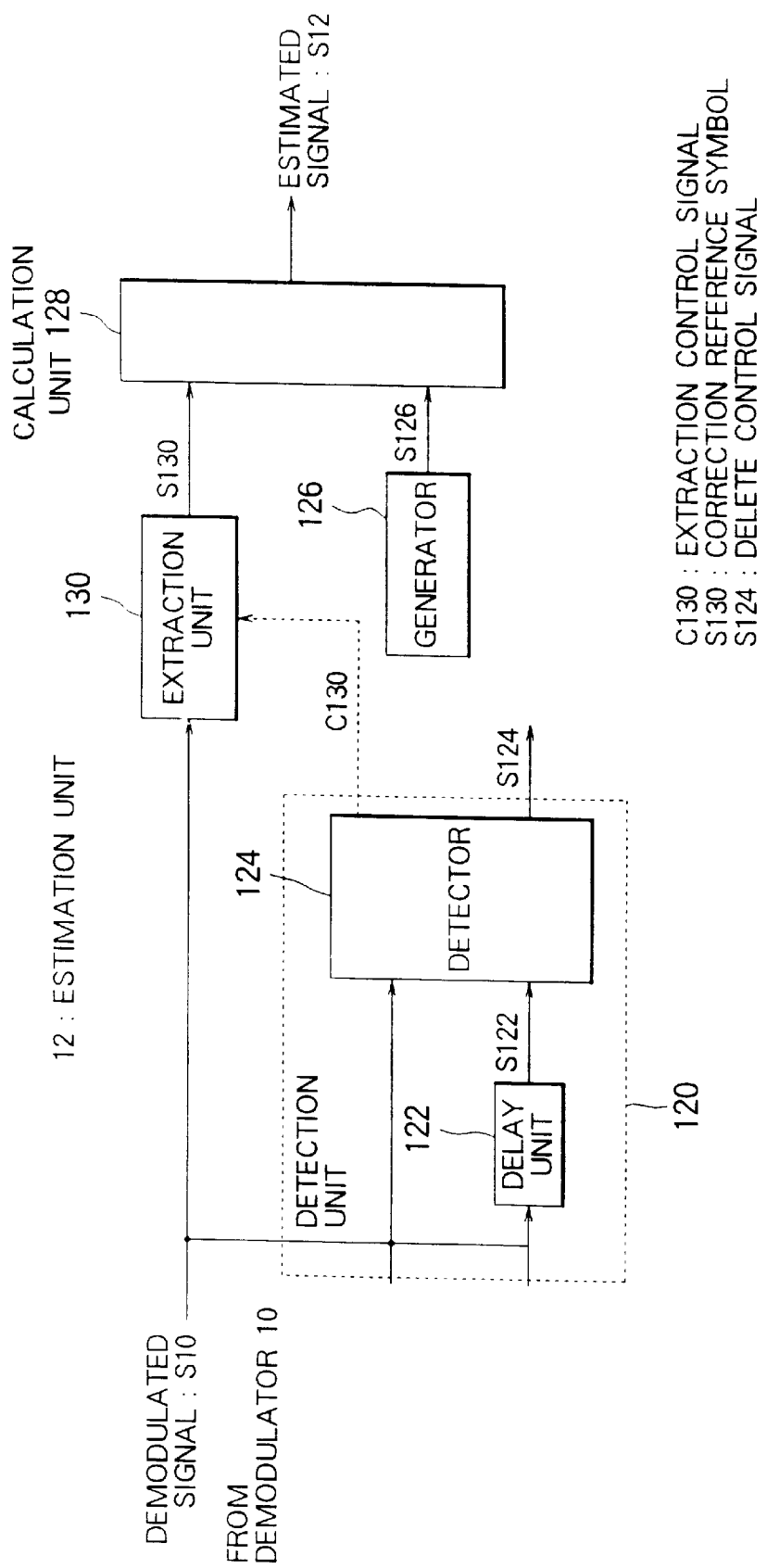

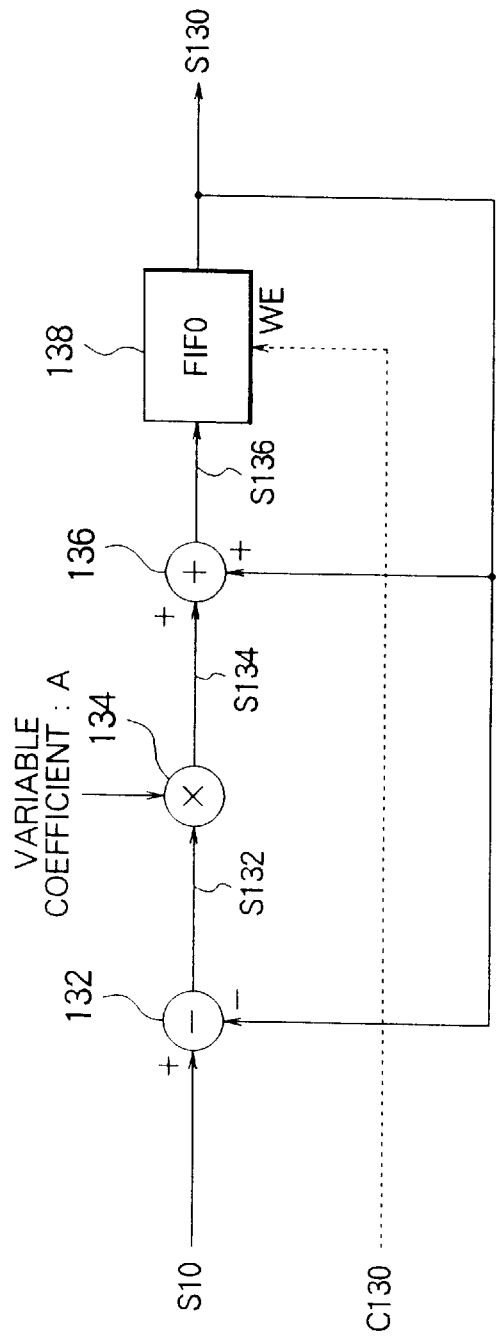

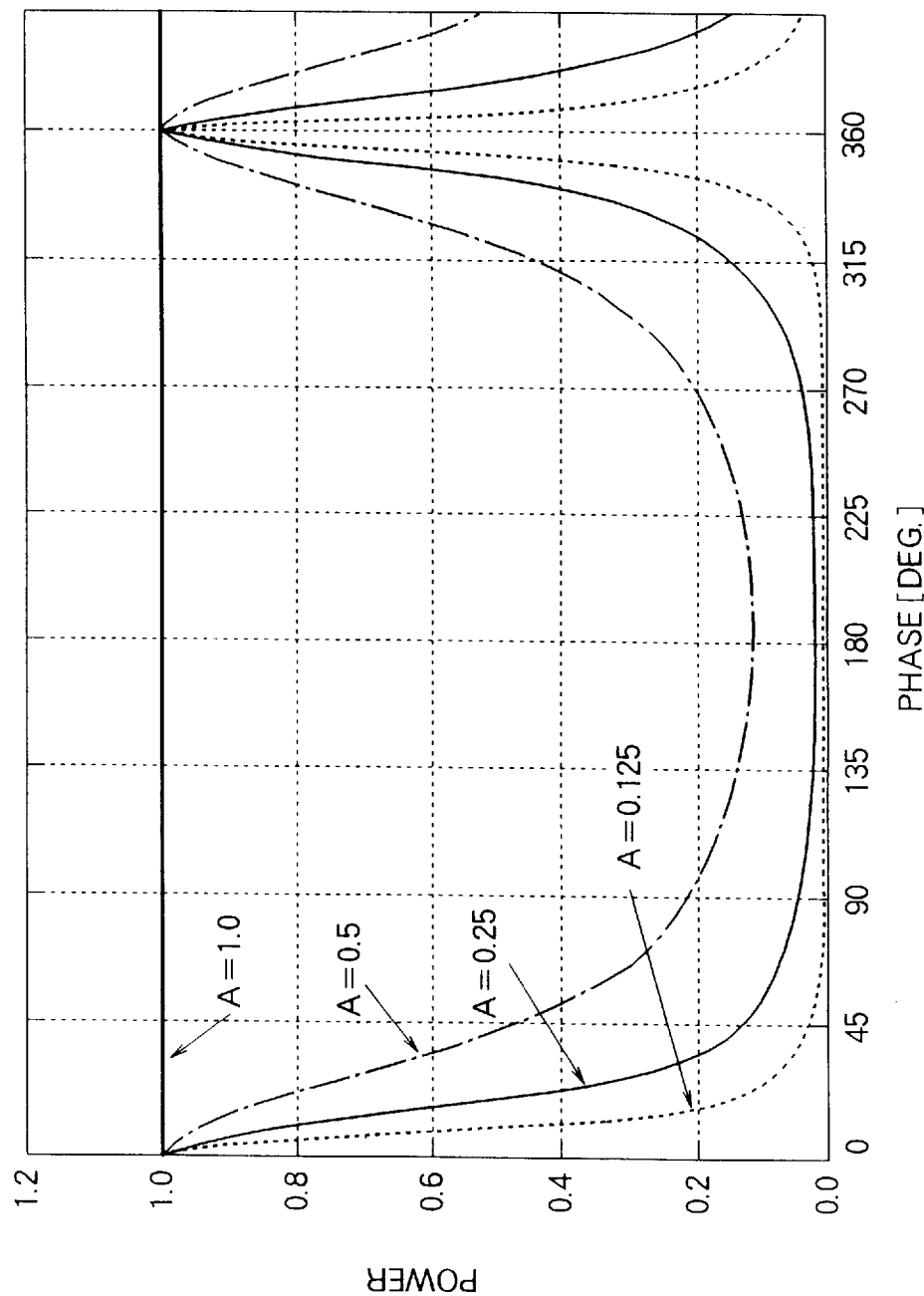

$$I_c = \frac{I_d I_r + Q_d Q_r}{I_d^2 + Q_d^2}$$

$$Q_c = \frac{I_d Q_r - Q_d I_r}{I_d^2 + Q_d^2}$$

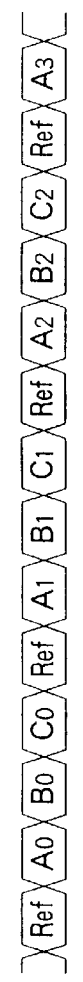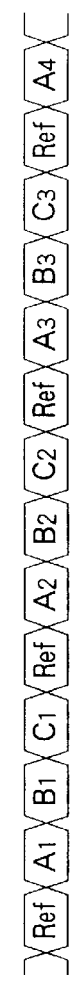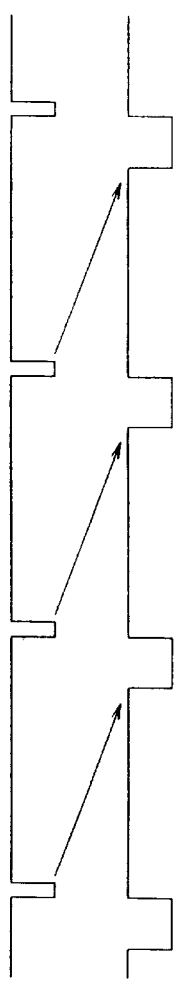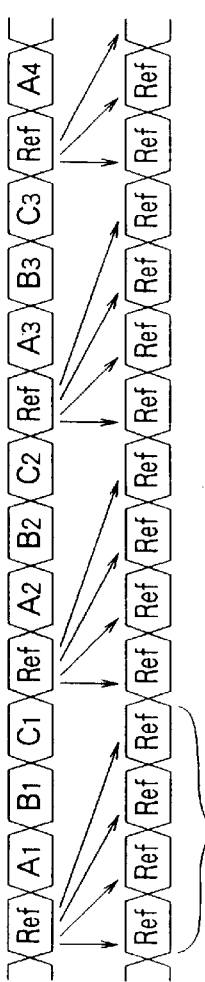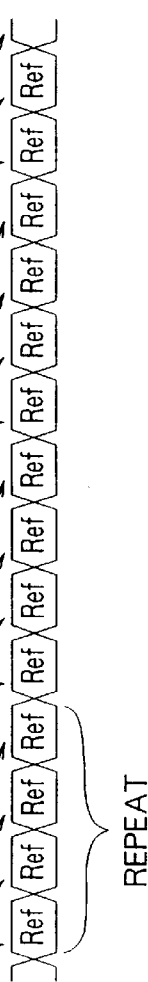
FIG. 7A  SIN
FIG. 7B  S10
FIG. 7C  S122
FIG. 7D  REFERENCE DETECTION
FIG. 7E  C130
FIG. 7F  S10
FIG. 7G  S130

14 : CORRECTION UNIT

FIG. 9A  S10  )(Ref)(A0)(B0)(C0)(Ref)(A1)(

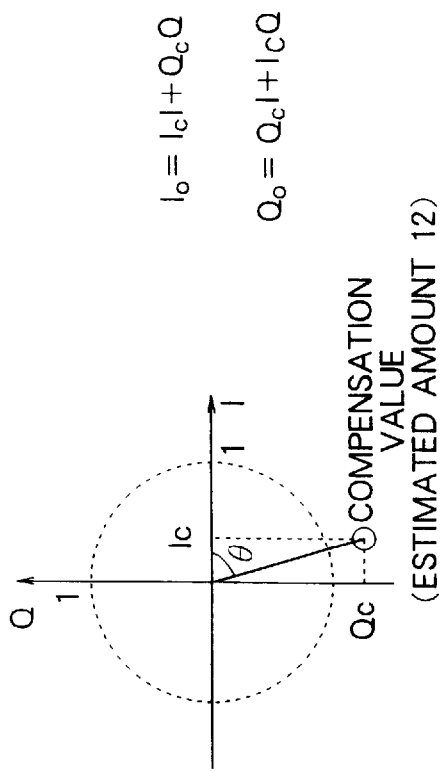
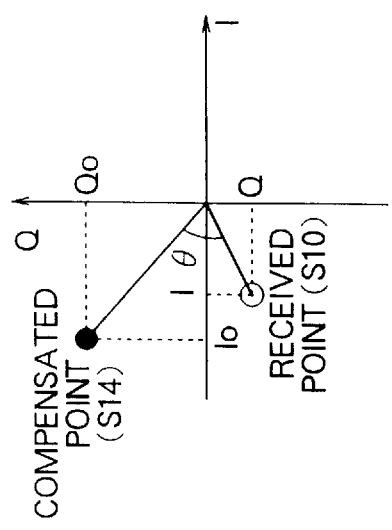

FIG. 14
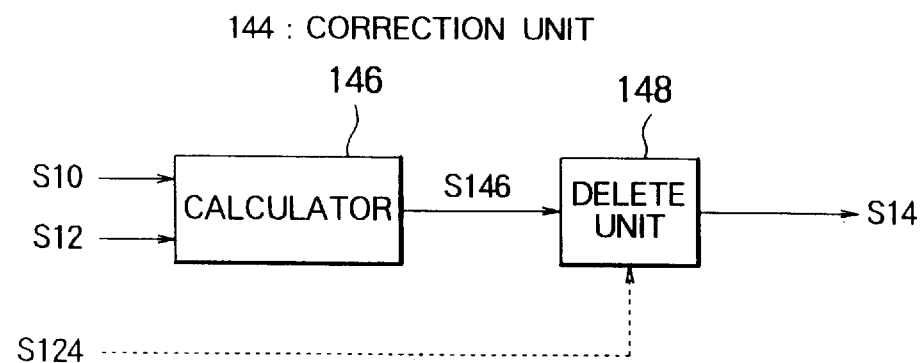
FIG. 15A  S10  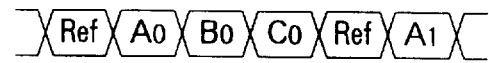
FIG. 15B  S146  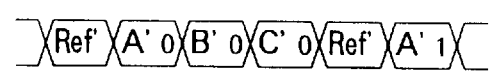
FIG. 15C  S14  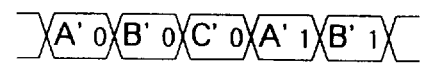

$$Br_n = \| Y - C_n H \|^2 \cdots (6)$$

DATA RECEPTION APPARATUS, DATA TRANSMISSION APPARATUS AND METHOD THEREOF

BACKGROUND OF THE INVENTION

1. Field of the Invention

The present invention relates to a data reception apparatus, a data transmission apparatus, and a method thereof, for receiving a transmission signal obtained by inserting a predetermined reference data at a predetermined cycle, performing orthogonal frequency division multiplexing (OFDM), and transmitting the result via a predetermined transmission line, compensating for the transmission characteristic of the transmission line by using the reference data, and demodulating the result.

2. Description of the Related Art

When transmitting digital data, generally a phase shift modulation method (PSK) wherein the phase of one carrier signal is brought into correspondence with the value of the transmission data to be transmitted or a quadrature amplitude modulation method (QAM) bringing the phase and amplitude into correspondence with the value of the transmission data, has been used. These methods are sometimes referred to as a single carrier method since a single carrier signal is used.

In addition to this single carrier method, a multi-carrier method such as an orthogonal frequency division multiplexing (OFDM) method performing the transmission of the digital data using carrier signals of a plurality of frequencies is now being used.

FIG. 1 is a view showing the configuration of a data reception apparatus 8 for demodulating transmission data SOUT from a reception signal SIN of the OFDM method.

As shown in FIG. 1, the data reception apparatus 8 is constituted by a demodulator 80 including a fast Fourier-Transformation circuit (FFT), a differential decoder 82, and a decoder 84. The data reception apparatus 8 demodulates an input transmission signal SIN (transmission signal of the OFDM method) transmitted via a transmission line (not shown) such as a cable communication channel, wireless communication channel, or broadcast channel, obtained by processing the transmission data and outputs the resulted as a decoded signal SOUT.

The transmission signal of the OFDM method is received from the transmission line by a reception circuit (not illustrated) positioned in front of the demodulator 80, is converted to a digital format, and applied as a received signal SIN to the demodulator 80.

The demodulator 80 applies fast Fourier transformation (FFT) to the received signal SIN to demodulate it and outputs the result as a demodulated signal S80 to the differential decoder 82. Note that, in the OFDM method, the transmission data is subjected to, for example, trellis coding modulation and further subjected to orthogonal frequency division multiplexing by inverse fast fourier transformation (IFFT) to make the transmission signal. Accordingly, by performing FFT on the transmission signal (received signal SIN), the transmission data before the orthogonal frequency division multiplexing can be demodulated.

The differential decoder 82 performs the differential decoding on the demodulated signal input from the demodulator apparatus 80 and outputs the result as the decoded signal S82 to the decoder 84.

The decoder 84 generates the branch metric of the differential decoder 82 and performs maximum likelihood decoding of the original transmission data based on this branch metric.

However, the demodulator 80, the differential decoder 82, and the decoder 84 of the data reception apparatus 8 shown in FIG. 1 perform individually independent processing, so the transmission characteristic of the transmission line with respect to the received signal SIN is not considered in the decoder 84. The decoder 84 compares the signal point on the signal plane of the decoded signal S82 and the assumed signal points to perform the maximum likelihood decision, so where the effect of the transmission characteristic is not considered, its capabilities cannot be completely exploited.

SUMMARY OF THE INVENTION

An object of the present invention is to overcome the above disadvantage of the related art and has its object to provide a data reception apparatus, a data transmission apparatus, and a method which perform correction based on the transmission characteristic of a transmission line (or transmission path) with respect to a demodulated signal obtained by demodulating a transmission signal or can perform maximum likelihood decoding considering the transmission characteristic of the transmission line.

According to the present invention, there is provided a data reception apparatus for receiving a transmission signal on which has been performed a predetermined modulation to a digital data, into which is inserted a predetermined reference data thereinto of a predetermined period, and which is transmitted through a transmission path, and for decoding the received signal. The data reception apparatus comprises a demodulating means for demodulating said received signal and providing a demodulated signal; a reference data extracting means for extracting said inserted reference data from said demodulated signal; an estimating means for estimating, the transmission characteristic of said transmission path with reference to said extracted reference data and providing an estimated data; and a decoding means for decoding said demodulated signal with reference to said estimated data.

The estimating means may comprise a reference data generating means for generating a reference data that is the same as said reference data inserted into said digital data in the predetermined period, and a calculating means for calculating said estimated data with reference to said extracted reference data and said generated reference data.

The estimating means may further comprise a reference data correcting means for correcting said extracted reference data.

The reference data correcting means may comprises a storage means for storing said corrected reference data, a subtracting means for calculating a difference between said corrected reference data stored in said storage means and a newly extracted reference data, a multiplying means for multiplying a transmission characteristic coefficient corresponding to said transmission characteristic of said transmission path to the calculated difference, and an adding means for adding said corrected reference data stored in said storage means to a multiplied data multiplied at said multiplying means.

The reference data correcting means may comprise a coefficient generating means for generating said transmission characteristic coefficient as a variable value, said coefficient generating means changing said transmission characteristic coefficient in reference to said transmission characteristic of said transmission path.

The decoding means may comprise a demodulation signal correcting means for correcting said demodulated signal with reference to said estimated data.

The decoding means may comprise a signal point assumption means for assuming a plurality of signal points of said demodulation signal, a distance calculating means for calculating the respective distances between said plurality of assumed signal points and said signal point of said demodulated and corrected signal, and a weighting means for weighting said calculated distances with reference to said estimated data.

The decoding means may comprise a signal point assumption means for assuming a plurality of signal points of the demodulation signal, a weighting means for weighting said assumed plurality of signal points with reference to said estimated data, and a distance calculating means for calculating the respective distances between said weighted plurality of signal points and the signal point of said demodulated signal.

The digital data is subject to predetermined modulation and the reference data is inserted thereinto in a predetermined period, an inverse fast Fourier transform is performed thereto to obtain an orthogonal frequency division multiplexing (OFDM) data, and said OFDM data is transmitted through said transmission path.

The demodulating means demodulates said received signal by performing a fast Fourier transform.

The digital data may be modulated by a trellis coding. The decoding means performs a Viterbi-decoding corresponding to said trellis coding.

Also, according to the present invention, there is provided a method of transmitting a digital data between a transmission side and a reception side through a transmission path, said method including:

a transmission method comprising the steps of inserting a reference data into said digital data in a predetermined period, and modulating said digital data with said inserted reference data, a reception method comprising the steps of receiving said modulated digital data as a transmission signal transmitted through said transmission path, demodulating said received transmission signal, extracting said reference data from said demodulated signal, estimating a transmission characteristic of said transmission path with reference to said extracted reference data, and decoding said demodulated signal in response to said estimated transmission characteristic of said transmission path.

The estimation of said transmission characteristic in said reception method is carried out by generating a reference data equivalent to said reference data inserted into said digital data in said transmission method, and performing a predetermined operation with said generated reference data and said extracted reference data.

The reception method includes a step for correcting said extracted reference data, and said estimation of said transmission characteristic is carried out by performing a predetermined operation with said corrected reference data, said generated reference data and said extracted reference data.

The reception method includes a step for correcting said demodulated signal with reference to said estimated transmission characteristic.

The decoding steps may include a step for assuming a plurality of signal points of said demodulation signal, steps for calculating distances between said plurality of signal points of said demodulation signal and said signal point of said demodulated and corrected signal, and a step for weighting said distances with reference to said estimated transmission characteristic of said transmission path.

The decoding step may include a step for assuming a plurality of signal points of the demodulation signal, a step of weighting said assumed plurality of signal points with reference to said estimated transmission characteristic of said transmission path, and a step for calculating distances between said plurality of weighted signal points and said signal point of said demodulation signal.

Further, according to the present invention, there is provided a data transmission apparatus comprising: a trellis coding modulation means for performing a trellis coding modulation to a digital data to be transmitted; a reference data insertion means for inserting a predetermined reference data into said trellis coding modulated data in a predetermined period; and an orthogonal frequency division multiplexing (OFDM) means for performing an inverse fast Fourier transform to said signal with said reference data inserted thereinto to provide an OFDM transmission data.

Specifically, in the present invention, the demodulating means uses FFT transformation to demodulate a transmission signal which has been generated by subjecting the transmission data to be transmitted to trellis coding modulation, inserting predetermined reference data therein at a predetermined cycle, and subjecting the resultant data to orthogonal frequency division multiplexing by IFFT and has been transmitted over a wireless communication channel or a cable communication channel, so as to obtain a demodulated signal.

The position signal generating means detects a symbol corresponding to the reference data from the demodulated signal and generates a position signal showing the position of this symbol.

The expectation signal generating means generates a reference data expectation signal showing the position of the signal point of the expected reference data based on, for example, the signal point on the signal plane (phase amplitude plane, complex plane) of the symbol of the reference data which has been used heretofore and the signal point of the symbol of the newly detected reference data.

The estimation amount calculating means calculates an estimation amount with respect to the demodulated signal corresponding to the effect given to the transmission signal by the transmission characteristic of the transmission line based on the signal point of the symbol of the detected reference data and the reference data expectation signal.

The transmission data decoding means deletes the symbol of the reference data based on the position signal generated by the position signal generating means and corrects the demodulated signal based on the estimation amount generated by the estimation amount calculating means. Further, when performing maximum likelihood decoding on the demodulated signal from which the symbol of the reference data has been deleted and which has been corrected, the transmission data is decoded by using a branch metric weighted based on the estimation amount.

BRIEF DESCRIPTION OF THE DRAWINGS

The above and other objects and features of the present invention will be more apparent with reference to the accompanying drawings, in which:

FIG. 3 is a view showing the configuration of the estimation unit shown in FIG. 2;

FIG. 4 is a view showing the configuration of the extraction unit shown in FIG. 3;

FIG. 5 is a graph showing a transfer function where a variable coefficient A to be input to the multiplier shown in FIG. 4 is changed;

FIG. 6B showing the estimation amount obtained as a result of computation by the calculation unit based on the signal point of the correction reference symbol S130 and the signal point of the reference data expectation signal S126 shown in FIG. 6A;

FIGS. 7A to 7G are views showing the operation of the estimation unit shown in FIG. 2;

FIGS. 9A to 9C are views showing the signal, FIG. 9A showing a demodulated signal S10; FIG. 9B showing a delete signal S140; and FIG. 9C showing a correction signal S14;

FIGS. 10A and 10B are views explaining the computation concerning the correction with respect to the decoded signal S10 in the correction unit shown in FIG. 2, FIG. 10A showing the signal point of the symbol of the transmission data contained in the decoded signal S10 and the correction signal S14 by a complex number expression; and FIG. 10B showing the signal point of the correction amount S12;

FIG. 13B showing the case where weighting by a weighting unit is not carried out; and FIG. 13C showing a case where weighting by the weighting unit is carried out;

FIG. 14 is a view showing the configuration and operation of the correction unit 144 used instead of the correction unit 14 in the data reception apparatus 1 shown in FIG. 2; FIGS. 15A to 15C are views of the signals, FIG. 15A showing the demodulated signal S10; FIG. 15B showing the output signal of the computation unit; and FIG. 15C showing the output signal of the delete unit;

DESCRIPTION OF THE PREFERRED EMBODIMENTS

FIRST EMBODIMENT

Below, a first embodiment of the present invention will be explained.

Figure 1:
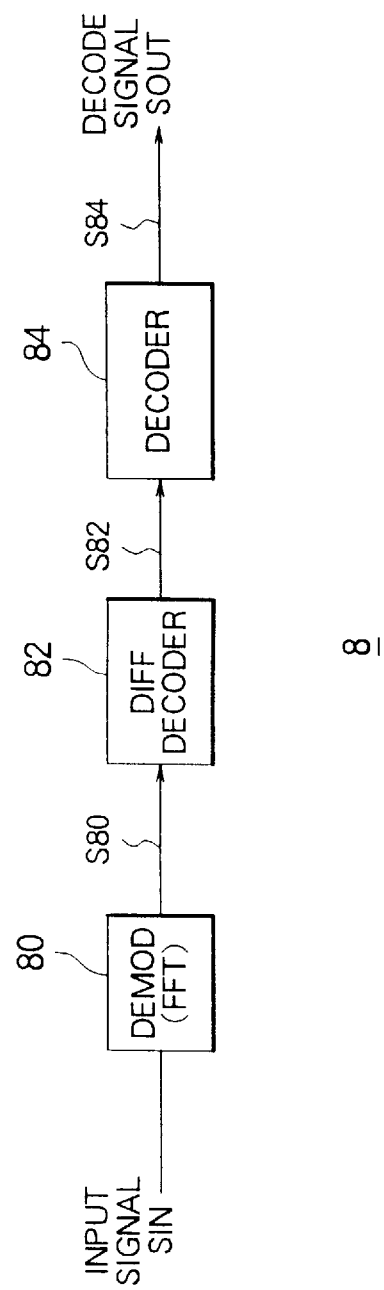
FIG. 1 is a view showing the configuration of a reception apparatus of the related art.
Figure 2:
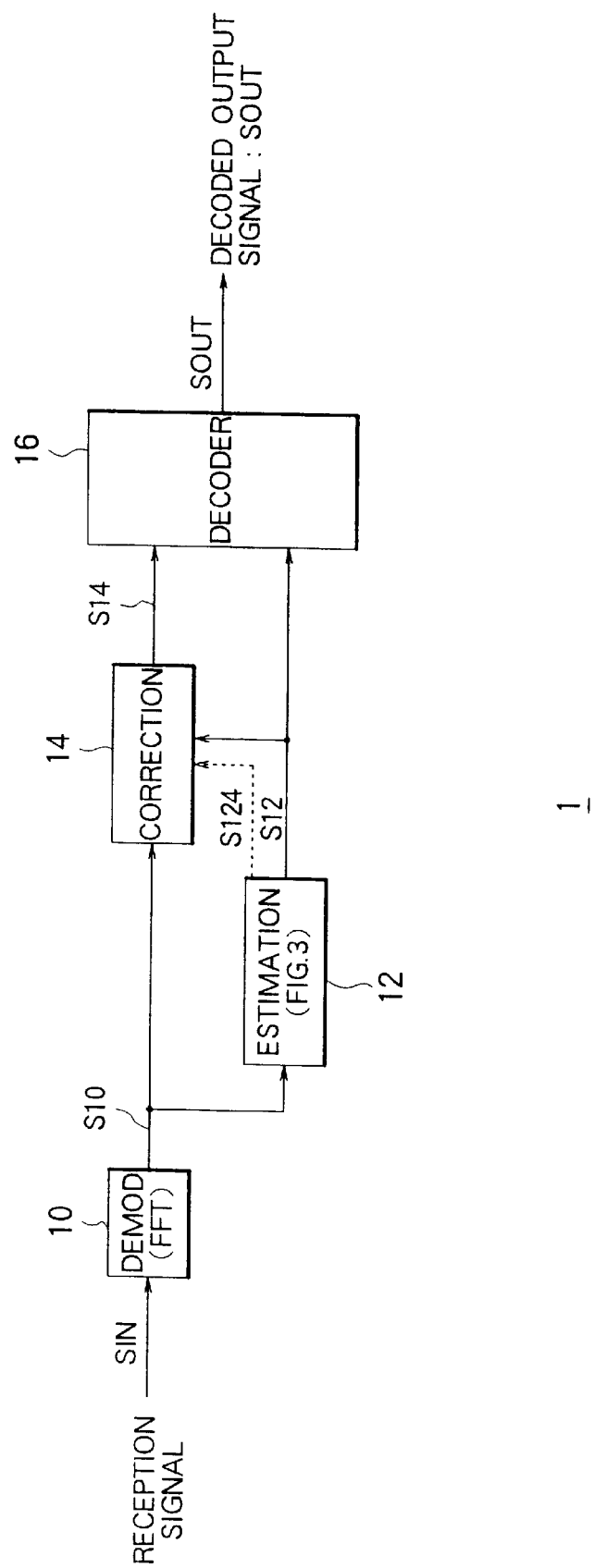
FIG. 2 is a view showing a configuration of a data reception apparatus according to a first embodiment of the present invention.

FIG. 2 is a view showing the configuration of a data reception apparatus 1 according to a first embodiment of the present invention.

As shown in FIG. 2, the data reception apparatus 1 is constituted by a demodulator (FFT) 10, an estimation unit 12, a correction unit 14, and a decoder 16. The reception apparatus, receives an input signal SIN as a transmission signal from a reception circuit (not illustrated) positioned preceding the demodulator 10. The transmission signal is generated by subjecting for example the transmission data to be transmitted to trellis coding modulation, inserting a predetermined reference data of a known value at a predetermined cycle into the trellis coded data, and subjecting the resultant data to orthogonal frequency division multiplexing (OFDM). The transmission signal is transmitted to the data reception apparatus 1 via a transmission line (transmission path) such as a wireless transmission channel or cable transmission channel. The transmission signal is influenced by the transmission characteristic of the transmission line in units of symbols. The data reception apparatus 1 demodulates and decodes the transmission signal, and outputs the result as a decoded output signal SOUT.

The demodulator 10 includes a fast Fourier transformation (FFT) circuit and demodulates the received, OFDM, input signal SIN by performing fast Fourier transformation (FFT) to generate a demodulated signal S10 containing symbols of the transmission data and reference data and outputs the same to the estimation unit 12 and the correction unit 14.

FIG. 3 is a view showing the configuration of the estimation unit 12 shown in FIG. 2.

FIG. 4 is a view showing the configuration of the extraction unit 130 shown in FIG. 3.

The estimation unit 12 is constituted by a detection unit 120, a generator 126, a calculation unit 128, and an extraction unit 130 as shown in FIG. 3. The detection unit 120 is constituted by a delay unit 122 and a detector 124.

The extraction unit 130 is constituted by a subtracter 132, a multiplier 134, an adder 136, and an FIFO memory 138 as shown in FIG. 4.

The estimation unit 12 generates an estimated value as an estimated signal S12 based on the demodulated signal s10 and a variable coefficient A ($0 \leq A \leq 1$) determined based on for example the amplitude of symbol of the reference data. The estimated value corresponds to the interference of the transmission characteristic of the transmission line passing the OFDM transmission signal. The estimated signal S12 is applied to the correction unit 14 and the decoder 16. The estimated value is used for correction of the demodulated signal s10 in the correction unit 14, and for weighting the branch metric in the decoder 16. The detector 124 in the estimation unit 12 generates a delete control signal S124 which indicates a position of the symbol of the reference data in the demodulated signal, and outputs the same to the correction unit 14.

In the detection unit 120, the delay unit 122 delays the demodulated signal S10 exactly by a time corresponding to the period in which the reference data is inserted into the transmission signal and outputs the same as a delay signal S122 to the detector 124.

The detector 124 detects the known symbol of the reference data from the demodulated signal S10 by examining the relationship between the demodulated signal S10 and the delay signal S122, generates an extraction control signal C130 showing the timing of the symbol of the reference data in the demodulated signal and a delete control signal S124, and outputs the same to the extraction unit 130 and the correction unit 14, respectively.

The extraction unit 130 extracts the symbol of the reference data contained in the demodulated signal S10 based on the extraction control signal C130, performs correction for deleting the noise component contained in the symbol of the reference data, and outputs the symbol of the corrected reference data (correction reference symbol) S130 to the calculation unit 128.

In the extraction unit 130, the subtracter 132 subtracts the value S130 of the symbol of the reference data which is stored in the FIFO memory 138, corrected during the cycle of a previous reference data, and stored, from the demodulated signal S10, and outputs a subtraction value S132 to the multiplier 134.

The multiplier 134 multiplies the variable coefficient A determined in accordance with the value of the symbol of the reference data and the subtraction value S132 calculated by the subtracter 132 and outputs a multiplication value S134 to the adder 136.

The adder 136 adds the multiplication value S134 and the value S130 of the symbol of the reference data which is stored in the FIFO memory 138 and corrected during the cycle of the previous reference data to correct the same and outputs a correction value S136 to the FIFO memory 138.

The extraction control signal C130 is input to a write enable input terminal WE of the FIFO memory 138. The correction value S136 is stored in synchronization with the extraction control signal C130 and is output as the correction reference symbol S130 to the calculation unit 128. Accordingly, the FIFO memory 138 stores the value (correction reference symbol S130) of the symbol of the reference data corrected for every cycle in which the reference data is processed by the subtracter 132, the multiplier 134, and the adder 136.

FIG. 5 is a graph showing a transfer function of a case where the variable coefficient A to be input to the multiplier 134 shown in FIG. 4 is changed.

As shown in FIG. 5, where the value of the variable coefficient A is 0, the value of the correction reference symbol of the previous cycle is stored in the FIFO memory 138 again and output. Also, where the value of the variable coefficient A is 1, the value of the correction reference symbol S130 of the previous cycle stored in the FIFO memory 138 no longer has any meaning. Only the value of the symbol of the reference data most recently detected from the demodulated signal S10 is stored in the FIFO memory 138 and output.

A small value of the variable coefficient A means that the pass-band frequency as a whole of the extraction unit 130 becomes narrow. Accordingly, if the value of the variable coefficient A is made small, the noise eliminating effect is improved. On the other hand, in this case, the traceability with respect to a change of the transmission characteristic of the transmission line becomes bad.

Conversely, a large value of the variable coefficient A means that the pass-band frequency as a whole of the extraction unit 130 becomes wide. Accordingly, if the value of the variable coefficient A is made large, the noise eliminating effect is lowered. On the other hand, in this case, the trackability with respect to a change of the transmission characteristic of the transmission line is improved.

Accordingly, where the transmission characteristic of the transmission line is stable, the value of the variable coefficient A is made small, while where the trackability with respect to the change of the transmission characteristic of the transmission line must be improved, for example, at the time of a change of the communication channel or a change of the channel at the turning on of the power source, or the like, desirably the value of the transmission characteristic coefficient A is made large. In this way, the value of the variable coefficient A is made variable. This can be easily realized by the method of reading a value for A from the ROM table in accordance with for example the value of the amplitude of the symbol of the reference data.

The generator 126 predicts the position at which the signal point of the symbol of the reference data inherently should occupy on the signal plane by generating a data pattern the same as that of the symbol of the reference data which is inserted on the transmission side and outputs the same as a reference data expectation signal S126 to the calculation unit 128.

The calculation unit 128 estimates the influence exerted upon the transmission signal by the transmission characteristic of the transmission line based on the correction reference symbol S130 and the reference data expectation signal S126 and outputs the result as an estimation amount S12.

Figure 6A:
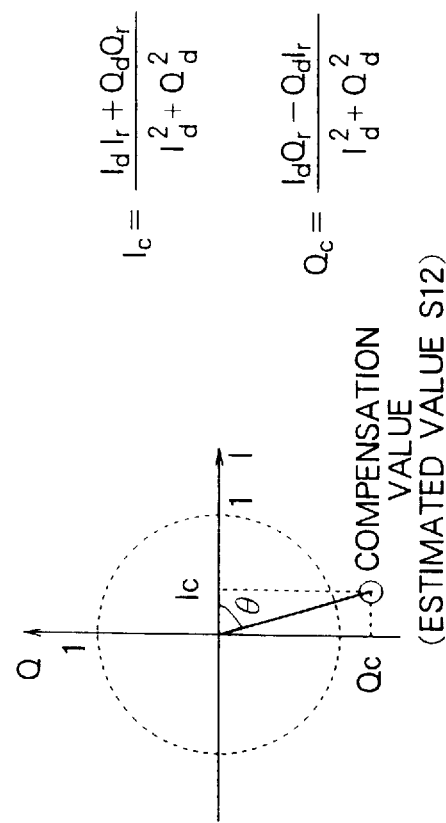
FIGS. 6A and 6B are views explaining the computation concerning the calculation of the estimation amount in the calculation unit shown in FIG. 3, FIG. 6A showing the signal point of the correction reference symbol S130 on the signal plane in complex number expression output from the extraction unit and the signal point of the reference data expectation signal S126 output from a generator.
Figure 6B:
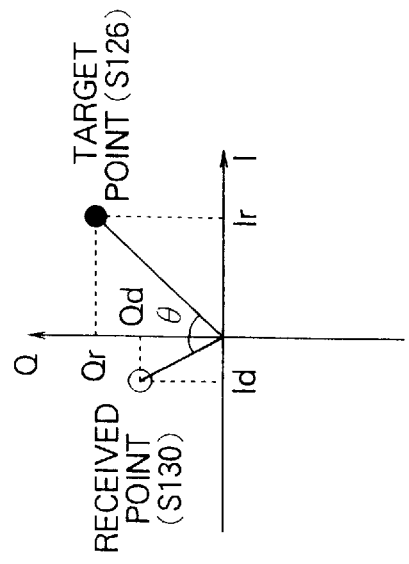

FIGS. 6A and 6B are views explaining the computation concerning the calculation of the estimation amount in the calculation unit 128 shown in FIG. 3, in which FIG. 6A illustrates a signal point of the correction reference symbol S130 on the signal plane by a complex number expression output from the extraction unit 130 shown in FIG. 3 and the signal point of the reference data expectation signal S126 output from the generator 126; and FIG. 6B shows the estimation amount S12 obtained as a result of computation by the calculation unit 128 based on the signal point of the correction reference symbol S130 shown in FIG. 6A and the signal point of the reference data expectation signal S126.

The relationship between the correction reference symbol S130 and the reference data expectation signal S126 on the signal plane becomes as shown in for example FIG. 6A by complex number expression.

The calculation unit 128 performs the computation of Equation 1 for the correction reference symbol S130 and the reference data expectation signal S126 and calculates the estimation amounts S12 ($I_c$, $Q_c$) shown in FIG. 6B. The computation of Equation 1 can be easily realized by referring to a predetermined computation circuit, calculator, or ROM table storing the estimation amount S12 in accordance with the value of the correction reference symbol S130 and the value of the reference data expectation signal S126

$$I_c = (I_d \cdot I_r + Q_d \cdot Q_r)/(I_d^2 + Q_d^2)$$

$$Q_c = (I_d \cdot Q_r + Q_d \cdot I_r)/(I_d^2 + Q_d^2) \quad (1)$$

where, $I_d$ and $I_r$ indicate the real number components of the signal points of the correction reference symbol S130 and the reference data expectation signal S126, respectively;

$Q_d$ and $Q_r$ indicate the imaginary number components of the signal points of the correction reference symbol S130 and the reference data expectation signal S126, respectively; and $I_c$ and $Q_c$ indicate the real number component and imaginary number component of the estimated amount S12, respectively Below, the overall operation of the estimation unit 12 will be explained.

FIGS. 7A to 7G are graphs explaining the operation of the estimation unit 12 shown in FIG. 2.

The transmission signal (signal train) shown in FIG. 7A is demodulated by the demodulator 10 and input to the delay unit 122 as the demodulated signal S10 in units of symbols.

As shown in FIGS. 7B and 7C, the delay unit 122 delays the demodulated signal S10 exactly by the cycle in which the reference data (Ref) was inserted into the transmission signal. The detector 124 detects the symbol of the reference data based on the demodulated signal S10 and the delay signal S122 at a timing shown in FIG. 7C and generates the extraction control signal C130 shown in FIG. 7E.

The extraction unit 130 extracts the symbol of the reference data from the demodulated signal S10 as shown in FIG. 7F (same as FIG. 7B) and FIG. 7G, corrects this, and outputs the result as the correction reference data S130.

The calculation unit 128 performs the computation shown in Equation 1 with respect to the correction reference symbol S130 and the reference data expectation signal S126, generates the estimated amount S12, and outputs the same.

Figure 8:
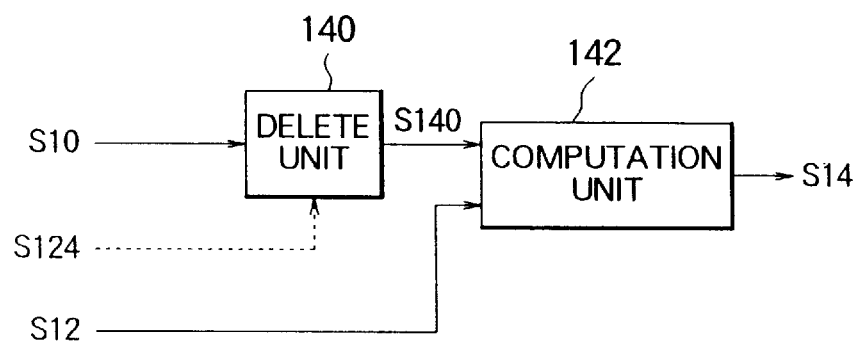
FIG. 8 is a view showing the configuration and operation of the correction unit shown in FIG. 2.

FIG. 8 is a view showing the configuration of the correction unit 14 shown in FIG. 2. FIGS. 9A to 9C are graphs showing the signals at the correction unit 14 in FIG. 8, FIG. 9A shows the demodulated signal S10; FIG. 9B shows the delete signal S140; and FIG. 9C shows the correction signal S14.

FIGS. 10A and 10B are views explaining the computation concerning the correction with respect to the decoding signal S10 in the correction unit 14 shown in FIG. 2 and FIG. 8, in which FIG. 10A illustrates the symbol of the transmission data contained in the decoded signal S10 and the signal point of the correction signal S14 by complex number expression; and FIG. 10B shows the signal point of the correction amount S12.

As shown in FIG. 8, the correction unit 14, constituted by the delete unit 140 and the computation unit 142, corrects the delete control signal S10 based on the estimation amount S12 input from the estimation unit 12, and outputs the resultant signal as the correction signal S14 (FIG. 9C) to the decoder 16.

The delete unit 140 deletes the symbol of the reference data from the demodulated signal S10 (FIG. 9A) based on the delete control signal S124 input from the estimation unit 12, and outputs the symbol deleted signal S140 (FIG. 9B).

Note that, the correction signal S14 output from the correction unit 14 becomes faster in signal speed than the demodulated signal S10, so the conversion of signal speed becomes necessary, but a signal speed converter performing such a operation is omitted for a simplification of the illustration.

The computation unit 142 performs the computation shown in the equation 2 with respect to the demodulated signal S10 based on the estimation amount S12 to correct the same. That is, when the computation of the equation 2 is carried out with respect to the symbol of the transmission data in which the signal point exists at a position shown in FIG. 10A by using the estimation amount S130 shown in FIG. 10B (same as FIG. 6B), the correction signal S14 shown in FIG. 10A can be obtained. Also the computation of the equation 2 can be easily realized by a similar method as that of equation 1.

$$I_o = I_c \cdot I - Q_c \cdot Q$$
$$Q_o = Q_c \cdot I - I_c \cdot Q \quad (2)$$

Where, I and Q are the real number component and imaginary number component of the signal point of the symbol of the transmission data contained in the decoded signal S10;

$I_o$ and $Q_o$ are the real number component and the imaginary number component of the signal point of the symbol of the transmission data contained in the correction signal S14; and $I_c$ and $Q_c$ are the real number component and the imaginary number component of the signal point of the symbol of the data contained in the estimated amount S12.

Figure 11:
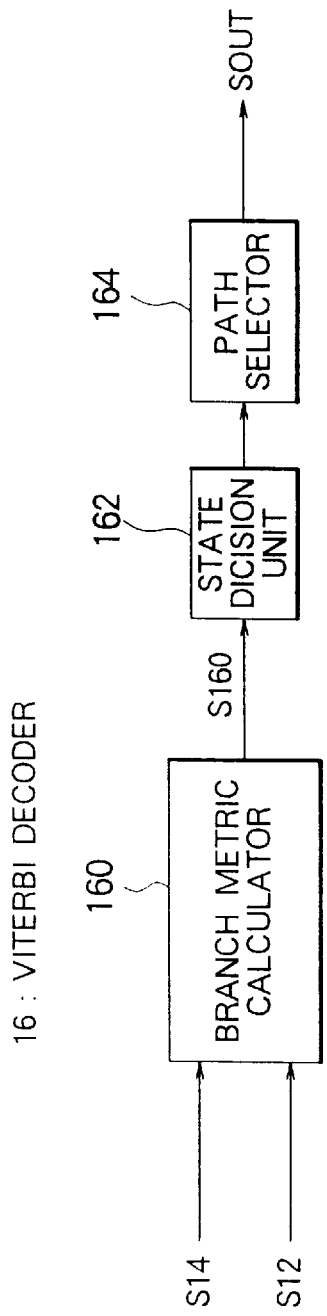
FIG. 11 is a view showing the configuration of the decoder shown in FIG. 2.

FIG. 11 is a view showing the configuration of the decoder 16 shown in FIG. 2.

Figure 12:
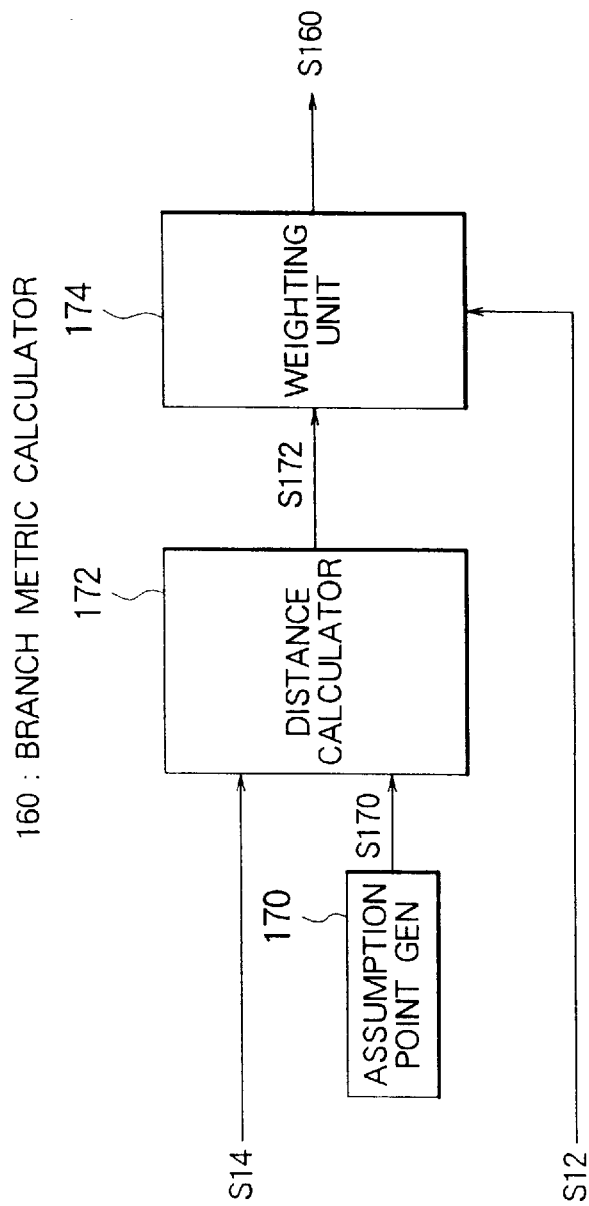
FIG. 12 is a view showing the configuration of the branch metric calculator shown in FIG. 11.

FIG. 12 is a view showing the configuration of the branch metric calculator 160 shown in FIG. 11.

The decoder 16 is preferably a Viterbi decoder as one example of the maximum likelihood decoder, in this embodiment. The Viterbi decoder 16 is constituted by, as shown in FIG. 11, a branch metric calculator 160, a state decision unit 162, and a path selector 164. The branch metric calculator 160 is constituted by, as shown in FIG. 12, an assumption point generator 170, a distance calculator 172, and a weighting unit 174.

The Viterbi decoder 16 generates the branch metric of the correction signal S14 input from the correction unit 14, weights the generated branch metric based on the estimation amount S12 input from the estimation unit 12, performs the maximum likelihood decoding and decodes the transmission data from the correction signal S14, and outputs the result as the decoded signal SOUT.

In the branch metric calculator 160, the assumption point generator 170 assumes the signal point of the correction signal S14 and outputs the same as the assumption signal point S170 to the distance calculator 172.

The distance calculator 172 calculates either of a distance (either selected from among a Euclidean distance, square of Euclidean distance, Hamming distance, or an absolute distance) between the assumption signal point S170 and the correction signal S14, and outputs the result as a distance signal S172 to the weighting unit 174.

Figures 13A, 13B, 13C:
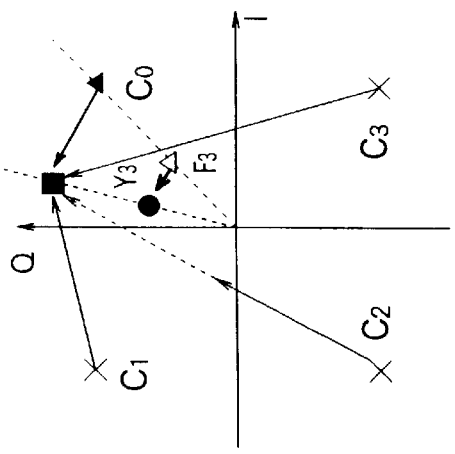
FIGS. 13A to 13C are graphs showing the operation of the decoder shown in FIG. 12, FIG. 13A showing the signal point of the symbol of the transmission data at the transmission and the symbol of the transmission data at the reception.

The weighting unit 174 weights the distance signal S172 based on the estimation amount S12 (performs the computation shown in the equation of FIG. 13C (note, H indicates the estimated value), generates a branch metric, and outputs the result as a branch metric S160 to a state decision unit 162.

The state decision unit 162 and the path selector 164, are the same as the state decision unit and the path selector conventionally used in a Viterbi decoder, decode the transmission data from the branch metric S160, and output the result as the decoded signal SOUT.

FIGS. 13A to 13C are graphs explaining the operation of the weighting unit 174. FIG. 13A is a graph showing a status of signal points where the signal is subjected by phase rotation due to noise in the transmission path, but is not subjected phasing (the variation of the amplitude). FIG. 13B is a graph showing a status of signal points where the signal is subjected to both phase rotation and phasing due to noise in the transmission path, and the branch metric is calculated without weighting.

FIG. 13C is a graph showing a status of signal points where the signal is subjected to both phase rotation and phasing due to noise in the transmission path, and the branch metric is calculated with weighing. In FIGS. 13A to 13C, black circles indicate signal points of the received signal (Y), black triangles indicate signal points of the transmitted signals, crosses indicate signal assumption points $C_0$ to $C_3$, and triangles indicate the signal points where the signals are subjected to phasing, but are not subjected to phase rotation. Solid with attached arrow marks indicate the calculated branch metrics. The branch metric Brn is calculated by the equations 3 to 5. H indicates the estimated value.

In FIG. 13A, the transmitted signal indicated as the signal point $T_1$ is received at the reception apparatus (receive), since the received signal is subjected to rotation due to noise in the transmission path, the transmission signal is changed to the signal as shown by the signal point $Y_1$. When calculating the branch metric between the signal point $Y_1$ and the signal assumption points $C_n$ by the equation 3, the branch metric S160 as shown by the solid line with arrow, is obtained.

In FIG. 13B, the transmitted signal shown by the signal point $T_2$ is received at the reception apparatus, the transmission signal is subjected to phasing in the transmission path to result in the signal point $F_2$, and the transmission signal is also subjected by the phase rotation due to noise in the transmission path to result in the signal point $Y_2$. This received signal as shown by the signal point $Y_2$ is corrected in the correction unit 14 to result in the signal shown by the signal point $P_2$. When calculating the branch metric between the corrected signal shown by the signal point $P_2$ and the signal assumption points $C_n$ by the equation 4, the branch metric S160, as shown by the solid line with arrow in FIG. 13B, is obtained.

In FIG. 13C, when the transmission signal is received at the reception apparatus, the received signal is expressed as the signal point $F_3$ since the signal is subjected to phasing in the transmission path, and the received signal is also expressed as the signal point $Y_3$ since the signal is subjected by the phase rotation due to noise in the transmission path. When the received signal is corrected in the correction unit 14, the signal shown by the signal point $P_3$ is obtained. When calculating the branch metric between the corrected signal shown by the signal point $P_3$ and the signal assumption points $C_n$ by equation 5, and weighting is carried out to the calculated branch metric, the branch metric S160, as shown by the solid line with arrow, is obtained.

Below, the operation of the data reception apparatus 1 will be explained by referring to FIG. 2 again.

The demodulator 10 demodulates the received transmission signal (received signal SIN) to generate a demodulated signal S10.

The estimation unit 12 generates the estimation amount S12 and a delete control signal S124 showing the position of the symbol of the reference data in the demodulated signal based on the demodulated signal S10 and the variable coefficient A.

The correction unit 14 corrects the demodulated signal S10 based on the estimation amount S12 and further deletes the symbol of the reference data from the demodulated signal S10 based on the delete control signal S124. The decoder 16 generates the branch metric of a correction signal S14, weights the branch metric generated based on the estimation amount S12, performs maximum likelihood decoding to decode the transmission data, and outputs the same as the decoded signal SOUT.

As explained above, according to the data reception apparatus 1 of the present invention, the Viterbi decoder 16 performs the maximum likelihood decoding corresponding to the transmission characteristic of the transmission line, so decoding considering the transmission characteristic of the transmission line with respect to the received signal SIN can be performed. Accordingly, the capabilities of the apparatus are enhanced.

SECOND EMBODIMENT

A second embodiment of the present invention will be explained.

FIG. 14 is a view showing the configuration and operation of a correction unit 144 used instead of the correction unit 14 in the data reception apparatus 1 shown in FIG. 2. FIG. 15A is a view showing the demodulated signal S10; FIG. 15B is a view showing the output signal of the computation unit 146; and FIG. 15C is a view showing the output signal of the delete unit 148.

As shown in FIG. 14, unlike the correction unit 14, in the correction unit 144, the position of the computation unit 146 and the position of the delete unit 148 performing the same operations as those of the computation unit 142 and the delete unit 140 are inverted. As shown in FIGS. 15A to 15C, this construction is made so that correction with respect to the demodulated signal S10 (FIG. 15A) is first carried out based on the estimation amount S12, and then the symbol of the reference data is deleted (FIG. 15C) and the result is output as the correction signal S14. The correction signal S14 output by the correction unit 144 and S14 output by the correction unit 14 become exactly the same. Note that, similar to FIG. 8, and FIG. 14, the signal speed converter is omitted.

THIRD EMBODIMENT

A third embodiment of the present invention will be explained.

Figure 16:
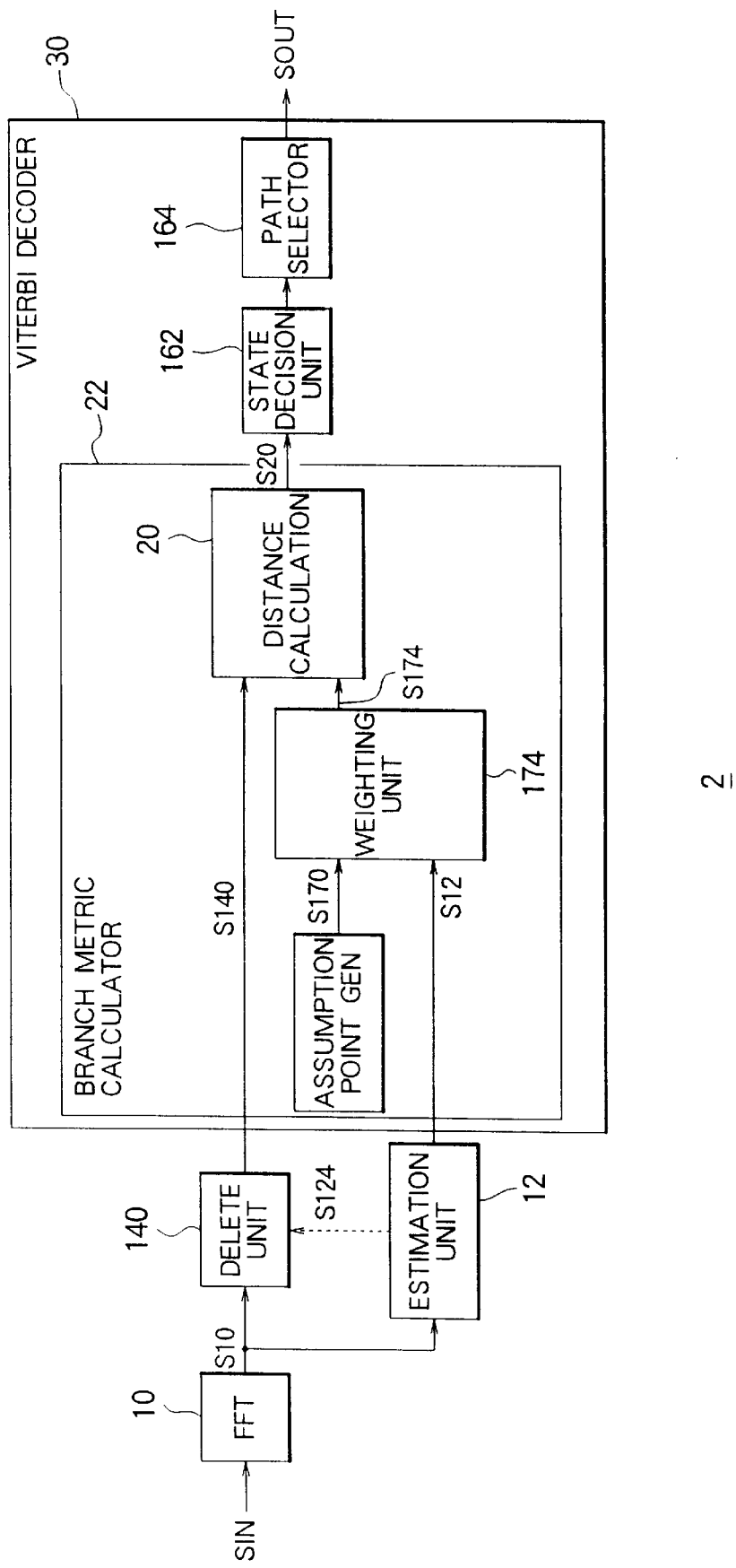
FIG. 16 is view showing the configuration of a data demodulation apparatus according to the present invention in the third embodiment.

FIG. 16 is a view showing the configuration of a data demodulation apparatus 2 according to the third embodiment of the present invention. Note that, among the constituent portions of the data demodulation apparatus 2, the same portions as the constituent portions of the data reception apparatus 1 shown in the first embodiment are indicated by the same reference numerals.

The demodulation apparatus 2 is constituted by the demodulator 10 including the FFT circuit, the delete unit 140, the estimation unit 12, and a decoder 30. The decoder 30 is constituted as a Viterbi decoder, comprising the branch metric calculator 22, the state decision unit 162, and the path selector 164. The branch metric calculator 22 is constituted by the assumption point generator 170, the weighting unit 174 and the distance calculator 20.

Figure 17:
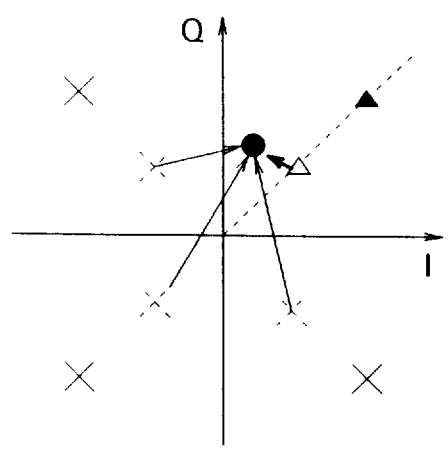
FIG. 17 is view showing the operation of the branch metric calculator shown in FIG. 16.

FIG. 17 is a view showing the operation of the branch metric calculator 22 shown in FIG. 16.

As shown in FIG. 16, the data demodulation apparatus 2 is constituted so that the correction unit 14 in the data reception apparatus 1 is omitted and the decoded signal S10 is directly input to the distance calculator 20 performing the same operation as the distance calculator 172.

The demodulated signal S10 demodulated at the FFT circuit 10 has the symbol of the reference data deleted by the delete unit 140 and is input to the distance calculator 20.

The weighting unit 174 weights the assumption signal point S170 generated by the assumption point generator 170 based on the estimation amount S12 (performs the computation of $C_n \times H$ by the equation 6 of FIG. 17) and outputs the same as a weighted assumption signal point S174 to the distance calculator 20.

The distance calculator 20 calculates a distance between the weighted assumption point signal S174 and the delete signal S140 (performs the computation of the equation 6 of FIG. 17) to generates the branch metric.

That is, as shown in FIG. 17, first, the weighting unit 174 weights the assumption point signal S170 (xmark of solid line) based on the estimation amount S12 corresponding to the transmission characteristic of the transmission line to generate the weighted assumption point signal S174 (xmark of broken line).

The distance calculator 20 calculates the branch metric (solid arrow) from the signal point (black circle) of the symbols of the transmission data of the weighted assumption point signal S174 and demodulated signal S10.

The state decision unit 162 and the path selector 164 decode the transmission data from the branch metric generated by the distance calculator 20 and output the same as the decoded signal SOUT.

As mentioned above, according to the data demodulation apparatus and the data transmission method according to the present invention, correction based on the transmission characteristic of the transmission line is carried out with respect to a demodulated signal obtained by demodulating a transmission signal subjected to trellis coding modulation and further subjected to orthogonal frequency division multiplexing or the maximum likelihood decoding considering the transmission characteristic of the transmission line.

Also, according to the data demodulation apparatus and data transmission method according to the present invention, where the transmission signal is generated by performing trellis coding modulation on the transmission data and further applying orthogonal frequency division multiplexing to the same, the coding gain when performing the maximum likelihood decoding can be enhanced, and the transmission data can be demodulated from the transmission signal with a high reliability.

What is claimed is:

1. A data reception apparatus for receiving and decoding a transmission signal that is a predetermined modulation of a digital data, into which is inserted predetermined reference data at a predetermined period, and that is transmitted through a transmission paths the data reception apparatus comprising:

receiving means;

demodulating means for demodulating said received signal and providing a demodulated signal;

reference data extracting means for extracting said inserted reference data from said demodulated signal;

reference data correcting means for correcting said reference data, said reference data correcting means including:

storage means for storing said corrected reference data;

subtracting means for calculating a difference between said corrected reference data stored in said storage means and more recently extracted reference data extracted by said reference data extracting means;

multiplying means for multiplying a transmission characteristic coefficient corresponding to a transmission characteristic of said transmission path with the calculated difference from said subtracting means; and adding means for adding said corrected reference data stored in said storage means to said multiplied data multiplied by said multiplying means;

estimating means for estimating said transmission characteristic of said transmission path with reference to said corrected reference data and providing estimated data; and decoding means for decoding said demodulated signal with reference to said estimated data.

2. The data reception apparatus as set forth in claim 1, wherein said estimating means comprises:

reference data generating means for generating second reference data the same as said reference data inserted into said digital data at the predetermined period; and calculating means for calculating said estimated data with reference to said corrected reference data and said generated second reference data.

3. The data reception apparatus as set forth in claim 1, wherein said reference data correcting means further comprises coefficient generating means for generating said transmission characteristic coefficient as a variable value, wherein said coefficient generating means changes said transmission characteristic coefficient in response to said transmission characteristic of said transmission path.

4. The data reception apparatus as set forth in claim 1, wherein said decoding means comprises demodulation signal correcting means for correcting said demodulated signal with reference to said estimated data.

5. The data reception apparatus as set forth in claim 1, wherein said decoding means further comprises:

signal point assumption means for assuming a plurality of signal points of said demodulation signal;

distance calculating means for calculating respective distances between said plurality of assumed signal points and said signal point of said demodulated and corrected signal; and weighting means for weighting said calculated distances with reference to said estimated data.

6. The data reception apparatus as set forth in claim 1, wherein said decoding means comprises:

signal point assumption means for assuming a plurality of signal points of said demodulation signal;

distance calculating means for calculating respective distances between said plurality of assumed signal points and a signal point of said demodulated signal; and weighting means for weighting said calculated distances with reference to said estimated data.

7. The data reception apparatus as set forth in claim 1, wherein said decoding means comprises:

signal point assumption means for assuming a plurality of signal points of the demodulation signal;

weighting means for weighting said assumed plurality of signal points with reference to said estimated data; and distance calculating means for calculating the respective distances between said weighted plurality of signal points and a signal point of said demodulated signal.

8. The data reception apparatus as set forth in claim 1, wherein an inverse fast Fourier transform is performed on said transmission signal to obtain orthogonal frequency division multiplexing (OFDM) data, said OFDM data being transmitted through said transmission path, and wherein said demodulating means demodulates said received signal by performing a fast Fourier transform.

9. The data reception apparatus as set forth in claim 1, wherein said digital data is modulated by trellis coding, and wherein said decoding means performs Viterbi-decoding corresponding to said trellis coding.

10. The data reception apparatus as set forth in claim 8, wherein said digital data is modulated by trellis coding, and wherein said decoding means performs Viterbi-decoding corresponding to said trellis coding.

11. A method of transmitting digital data between a transmission side and a reception side through a transmission path, said method including:

a transmission method comprising the steps of inserting reference data into said digital data at a predetermined period; and modulating said digital data including said reference data; and a reception method comprising the steps of:

receiving said modulated digital data as a transmission signal transmitted through said transmission path;

demodulating said received transmission signal;

extracting said reference data from said demodulated signal;

retrieving from a memory reference data that was corrected and stored during a previous time period;

subtracting the extracted reference data from the retrieved reference data;

multiplying the results of the subtracting step by a transmission characteristic coefficient;

adding the results of the subtracting step to the retrieved reference data;

replacing the retrieved reference data stored in the memory with the results of the adding step;

estimating a transmission characteristic of said transmission path with reference to the results of the adding step; and decoding said demodulated signal in response to said estimated transmission characteristic of said transmission path.

12. The method as set forth in claim 11, wherein said step of estimating said transmission characteristic comprises the steps of:

generating second reference data the same as said reference data inserted into said digital data; and performing a predetermined operation with said generated second reference data and said corrected reference data.

13. The method as set forth in claim 11, including a step of correcting said demodulated signal with reference to said estimated transmission characteristic.

14. The method as set forth in claim 13, wherein said decoding step includes the steps of:

assuming a plurality of signal points of said demodulation signal;

calculating distances between said plurality of signal points of said demodulation signal and a signal point of said demodulated and corrected signal; and weighting said distances with reference to said estimated transmission characteristic of said transmission path.

15. The method as set forth in claim 13, wherein said decoding step includes the steps of:

assuming a plurality of signal points of the demodulation signal;

weighting said assumed plurality of signal points with reference to said estimated transmission characteristic of said transmission path; and calculating distances between said plurality of weighted signal points and a signal point of said demodulation signal.

* * * * *